United States Patent [19]

Schlaikjer

[11] Patent Number: 4,629,666

[45] Date of Patent: Dec. 16, 1986

[54] SEPARATORS FOR ELECTROCHEMICAL CELLS

[75] Inventor: Carl R. Schlaikjer, Winchester, Mass.

[73] Assignee: Duracell Inc., Bethel, Conn.

[21] Appl. No.: 800,857

[22] Filed: Nov. 22, 1985

[51] Int. Cl.$^4$ ............................................. H01M 6/14
[52] U.S. Cl. ................................... 429/194; 429/249; 429/199; 429/254
[58] Field of Search ............... 429/194, 199, 197, 247, 429/249, 254, 218; 428/421

[56] References Cited

U.S. PATENT DOCUMENTS 4,508,800  4/1985  Gopikanth et al. ............. 429/199 X
4,513,067  4/1985  Kuo et al. ........................ 429/199 X Primary Examiner—Anthony Skapars
Attorney, Agent, or Firm—Ronald S. Cornell

[57] ABSTRACT

This invention pertains to separators for electrochemical cells. These separators are best suited for electrochemical cells which contain reactive metals such as lithium and strong oxidants. It has been discovered that a certain class of partially halogenated hydrocarbons will stand up to these materials without degrading.

12 Claims, No Drawings

SEPARATORS FOR ELECTROCHEMICAL CELLS

This invention relates to a class of partially halogenated polymers which can be formed into a microporous separator material for inorganic electrolyte/alkali metal containing electrochemical cells. It has been discovered that for a polymer with a stoichiometry of $(C_4X_4H_4)_n$ (where X=halogen) only one structural isomeric form does not degrade when employed in an inorganic electrolyte/alkali metal containing cell that has half cell potentials that fall between $-3.045$ V and $1.460$ V versus the standard hydrogen potential.

There are many desirable features in electrochemical cells which employ liquid depolarizers as cathode active materials. Such cells have high energy density, high capability, flat discharge voltage, and a wide temperature range of operation. The use of a liquid depolarizer does introduce some problems that are unique to these systems. Liquid depolarizers are inorganic oxidizing agents. Every component in the cell must therefore be made of a material which is not easily oxidized. Of particular concern is the separator material. Not only is the separator bathed in the inorganic electrolyte but it is also in physical contact with the anode. The separator must be made of a material that is chemically stable toward both the inorganic electrolyte and the anode. When the anode is an alkali metal such as lithium or sodium and the inorganic electrolyte contains a liquid depolarizer such as $SO_2$, $SOCl_2$, $SO_3$, $POCl_3$, $SO_2Cl_2$, or $SeOCl_2$ there are a limited number of materials which have the requisite chemical stability.

A separator suitable in inorganic electrolyte cells should be microporous, flexible, thin, and have good mechanical strength in addition to having the requisite chemical stability. A suitable microporous separator should have pore sizes not greater than 10 microns. Microporosity of the separator is important for rechargeable cells. During recharge of the cell it is possible to form dendrites of anode material on the anode. Such dendrites can grow back from the anode, through the separator, and short out to the cathode. When the separator is microporous it acts to retard the growth of the dendrite thereby preventing a short to the cathode which could cause a hazardous situation. The separator also should be flexible, thin, and have good mechanical strength so that the rechargeable cell described above can be spirally wound so as to increase the surface area of the electrodes which enhances the high rate capability of the cell.

Commonly assigned U.S. Pat. Nos. 4,508,798; 4,508,799; 4,508,800; 4,510,220; and 4,513,067 disclose rechargeable cells which use an electrolyte comprised of $SO_2$ and $LiAlCl_4$. During overcharge of these cells there is a significant level of chlorine gas and $AlCl_3$ generated. The chlorine diffuses throughout the electrolyte and comes into contact with the separator. Separators prepared from hydrocarbon materials do not stand up in such a chlorine environment. The only commercially available separators which can withstand oxidation by chlorine and reduction by lithium are made of glass. Glass separators are undesirable because of their thickness, large pore dimensions, and brittleness. A suitable separator material for use in the rechargeable $SO_2$ cells discussed here needs to be non-reactive at the $Li/Li+$ potential of $-3.045$ V vs. $H_2/H+$ and the $Cl_2/Cl-$ potential of $+1.358$ V vs. $H_2/H+$.

Separators prepared from thermoplastic fibers have been used with inorganic electrolytes that are not as reactive as the electrolytes contemplated herein. U.S. Pat. No. 4,219,515 discloses separator materials made from fibers which are suitable for use in the manufacture of chlorine and caustic soda. The lesser reactivity of this system is evident from the disclosure of suitable materials as including Teflon and polypropylene, both of which either degrade in the inorganic electrolytes contemplated herein or react with lithium. Additionally, separators which are made from fibers are generally characterized as non-woven materials. As such, they do not have the microporosity which is required for a rechargeable cell.

It is an object of this invention to provide a material that can be formed into a microporous separator and is chemically non-reactive in inorganic electrolytes which are comprised of solvents such as $SO_2$, $SOCl_2$, $SO_3$, and $SO_2Cl_2$ and solutes such as $LiAlCl_4$, $LiGaCl_4$, $AlCl_3$, and chlorine.

It is another object to provide a separator for electrochemical cells with the above defined chemical stability that is also flexible and mechanically strong.

It is another object of the invention to provide a microporous separator stable within the voltage limits of $-3.045$ V to $1.460$ V vs. the standard hydrogen potential.

This invention is based on the discovery that a specific molecular structure of partially halogenated hydrocarbon polymers has the requisite chemical stability to resist reduction by lithium and oxidation by chlorine. Non-porous films of these partially halogenated materials were used to determine chemical stability in inorganic electrolytes which contain solvents like $SO_2$, $SOCl_2$, and $SO_2Cl_2$ and solutes like $LiAlCl_4$, $LiGaCl_4$, $AlCl_3$, and chlorine.

It has been unexpectedly discovered that for the class of partially halogenated hydrocarbons with a stoichiometry of $C_4X_4H_4$ (X=fluorine or chlorine), those which are copolymers of ethylene and a fully halogenated analogue of ethylene and have the isomeric structure of

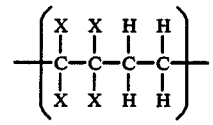

are stable in the presence of reducing agents like lithium and oxidants like $Cl_2$. This group includes tetrafluoroethylene-ethylene(TFE-E) copolymer, chlorotrifluoroethylene-ethylene(CTFE-E) copolymer, 1,1-dichloro-2,2-difluoroethylene-ethylene(11DCDFE-E) copolymer, 1,2-dichloro-1,2-difluoroethylene-ethylene(12DCDFE-E) copolymer, trichlorofluoroethylene-ethylene(TCFE-E) copolymer, and tetrachloroethylene-ethylene(TCE-E) copolymer. These materials, when formed into microporous films, provide a new class of organic materials useful as separators for use in electrochemical cells with corrosive environments.

The chemical stability of materials that have the structure recited above has been demonstrated. Other structural isomers with the same chemical formula will not have the wide range of properties as the materials claimed in this invention.

The objects, features, and advantages of this invention will become apparent after consideration of the following examples.

COMPARATIVE EXAMPLE A

A piece of lithium was sandwiched between two pieces of tetrafluoroethylene (TFE) in an argon atmosphere. Physical contact was ensured by passing these sandwiched materials between compression rollers. This sandwiched lithium was put into a polyethylene bag and sealed so that it could be removed from the argon atmosphere for high temperature storage. The sample was stored for a week at 70 C. After 1 week storage the TFE sample had blackened and become brittle. The fully fluorinated polymer was reactive toward lithium.

EXAMPLE 1

A microporous film of tetrafluoroethylene-ethylene copolymer was prepared according to the following procedure. A mixture of 50 g Tefzel 200 (DuPont) pellets and 29 g sodium chloride (Morton Chemical TFC 325 salt) was added to the mixing bowl of the Plasticorder preheated to 280–290 C. This was mixed at 60 RPM for 6 min. under nitrogen. The polymer-additive mixture was pressed in a Pasadena Hydraulics press pre-heated at 550–560 F. The contact time was 10 min, followed by 2 min under 20,000 psig pressure and then cooling while still under pressure. The salt was extracted from the pressed film by refluxing in water for 48 hours. The extracted film was dried under vacuum at 95–105 C. for 48 hours. The surface was embossed with a fine emery cloth. Analysis by electron microscopy revealed that a microporous film of TFE-E copolymer had been prepared.

EXAMPLE 2

Using a set-up similar to Comparative Example A a piece of lithium was sandwiched between two pieces of tetrafluoroethylene-ethylene(TFE-E) copolymer. Likewise the sample was passed through compression rollers and then sealed in a polyethylene bag. The sample was stored for 1 week at 70 C. After the 1 week storage the sample was examined. There were no indications of any reaction between the partially halogenated polymer and lithium. The film was clear and retained its mechanical integrity.

EXAMPLE 3

In an argon atmosphere, a 0.5" diameter disc of chlorotrifluoroethylene-ethylene copolymer was cut from a sheet 2 mil thick. A 0.375" disc of lithium was cut from foil that was 3 mil thick. The CTFE-E disc was put into a glass vial and the lithium disc placed on top of it. A 12.5 g weight was placed on top of the lithium to ensure contact. The vial was filled with 7 milliliters of 0.75M LiAsF$_6$ propylene carbonate/dimethoxyethane (2/1 v/v) electrolyte. The vial was sealed and stored at 70 C. for 1 week. After 1 week storage there was no sign of reaction between the lithium and the CTFE-E copolymer film.

COMPARATIVE EXAMPLE B

The rechargeable SO$_2$ containing cells discussed above generate Cl$_2$ during overcharge. Specifically these cells are comprised of a lithium anode and a cathode such as CuCl$_2$. The electrolyte is LiAlCl$_4$ and SO$_2$, with the SO$_2$ to LiAlCl$_4$ ratio being 3/1. During overcharge of such a cell there is generation of Cl$_2$ and AlCl$_3$. A totally hydrocarbon separator will not stand up to this environment, as seen in this example. A 4 cm$^2$ piece of polypropylene (Celgard 3401) was placed into a threaded glass tube. To this was added 5 ml. of LiAlCl$_4$ AlCl$_3$ 0.5Cl$_2$ 6SO$_2$, which simulates the environment in an overcharged cell. A valved fitting was then threaded into the glass tube to seal it off. After 3 hours at room temperature the polypropylene sample had reacted. It turned a dark brown color and shredded into small fragments.

EXAMPLE 4

In a set-up similar to Example B the TFE-E copolymer was tested. A more severe test was used in that the electrolyte composition was LiAlCl$_4$ 3AlCl$_3$ 1.5Cl$_2$ 12SO$_2$. A 4 cm$^2$ piece of TFE-E was tested. After 1 week storage at room temperature there was no sign of any reaction between the TFE-E copolymer and the electrolyte. The sample was then stored for 4 hours at 70 C. The TFE-E copolymer film remained stable even under these severe conditions.

COMPARATIVE EXAMPLE C

Polyvinylidene fluoride (PVDF) is a structural isomer of TFE-E copolymer. It has repeating units of (CF$_2$CH$_2$) instead of (CF$_2$CF$_2$CH$_2$CH$_2$). In a set-up similar to Example B and 4, a 4 cm$^2$ piece of PVDF was stored in LiAlCl$_4$ AlCl$_3$ 0.5Cl$_2$ 6SO$_2$. The sample turned brown immediately upon exposure to the electrolyte. After thirty minutes the sample was dark brown and after three hours it was nearly disintegrated. This example demonstrates the importance of the molecular structure to a polymer's stability in corrosive inorganic electrolytes.

EXAMPLE 5

In a set-up similar to Examples 2, 3 and C a 4 cm$^2$ piece of CTFE-E was tested. The electrolyte composition was LiAlCl$_4$ AlCl$_3$ 0.5Cl$_2$ 6SO$_2$. After 1 week at room temperature there was no visible sign of reaction. This same sample was then stored at 70 C. for 4 hours. After this storage condition there was no visible signs of reaction. The sample was intact and retained all of its physical characteristics.

The above examples establish the stability of the claimed films toward lithium and toward a mixture of AlCl$_3$ and Cl$_2$. Translated into voltages this says that the claimed films are stable within the range of $-3.045$ V to 1.358 V vs the H$_2$/H+ potential. These films would be stable to any depolarizers whose half cell potentials fall within this range. Such depolarizers include SOCl$_2$, SO$_2$Cl$_2$, S$_2$O$_5$Cl$_2$, SO$_3$, POCl$_3$, P$_2$O$_3$Cl$_4$, SeOCl$_2$, CrO$_2$Cl$_2$, VOCl$_3$, CSCl$_2$, CH$_3$CClO, and Si$_2$OCl$_6$.

The above examples all used non-porous films of the preferred materials. However, several well known techniques exist for preparing microporous films from plastics. These methods include the extrusion of films containing (a) an extractable solid filler (Example 1), or (b) an extractable liquid substance such as a solvent. Other techniques for introducing microporosity into films include (a) cutting holes with a pulsed laser, (b) stretching prepared films, (c) polymer sintering with or without blowing agent, (d) co-extrusion of the polymer with acrylate and pyrolysis of the filler, (e) using a polymer latex with or without a filler, and (f) track etching a film.

The above examples are given to enable those skilled in the art to more clearly understand the concepts of the present invention. The examples should not be considered as a limitation upon the scope of the present invention, but merely as being illustrative thereof.

What is claimed is:

1. An electrochemical cell comprising a container having two electrically isolated terminals; the container having therein an anode connected to one terminal, a cathode connected to the other terminal, a fluid electrolyte, an ionizable solute dissolved in said electrolyte, and a separator positioned between and in contact with the anode and the cathode; wherein the separator is characterized by being a substantially continuous microporous film comprising a polymer that is a copolymer of ethylene and a fully halogenated analogue of ethylene having the following formula:

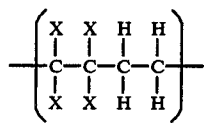

where the X's are halogens.

2. The cell recited in claim 1 wherein the halogens are selected from the group consisting of chlorine and fluorine.

3. The cell recited in claim 2 wherein the fluid electrolyte is comprised of a liquid depolarizer.

4. The cell recited in claim 2 wherein the fluid electrolyte comprises a solvent or material selected from the group consisting of $SO_2$, $SOCl_2$, $SO_2Cl_2$, $S_2O_5Cl_2$, $SO_3$, $POCl_3$, $P_2O_3Cl_4$, $SeOCl_2$, $CrO_2Cl_2$, $VOCl_3$, $CSCl_2$, $CH_3CClO$, $Si_2OCl_6$, and $Cl_2$.

5. The cell recited in claim 4 wherein the X's represent fluorine.

6. The cell recited in claim 4 wherein 3 of the X's represent fluorine and the fourth X is chlorine.

7. The cell recited in claim 4 wherein the anode is comprised of an alkali or alkaline earth metal or mixtures thereof.

8. The cell recited in claim 4 wherein the anode is comprised of lithium.

9. An electrochemical cell comprising a container having two electrically isolated terminals; the container having therein an anode connected to one terminal, a cathode connected to the other terminal, a fluid electrolyte, an ionizable solute dissolved in said electrolyte, and a separator positioned between the anode and the cathode; wherein the separator is characterized by being a microporous film that is fabricated from a polymer having a repeating formula of alternating units of ($CF_2CFX$) and ($CH_2CH_2$) where X is fluorine or chlorine.

10. The cell recited in claim 9 wherein the fluid electrolyte contains a solvent selected from the group consisting of $SO_2$, $SOCl_2$, $SO_2Cl_2$, $S_2O_5Cl_2$, $SO_3$, $POCl_3$, $P_2O_3Cl_4$, $SeOCl_2$, $CrO_2Cl_2$, $VOCl_3$, $CSCl_2$, $CH_3CClO$, and $Si_2OCl_6$.

11. The cell recited in claim 9 wherein the fluid electrolyte is comprised of $SOCl_2$, the solute is comprised of $LiAlCl_4$, and the anode is comprised of lithium.

12. The cell recited in claim 9 wherein the fluid electrolyte is comprised of $SO_2$, the solute is comprised of $LiAlCl_4$, and the anode is comprised of lithium.

* * * * *